(12) United States Patent
Thibodeau et al.

(10) Patent No.: US 6,520,392 B2
(45) Date of Patent: Feb. 18, 2003

(54) BACKUP BUCKLE FOR A SEAT BELT

(76) Inventors: Daniel D. L. Thibodeau, 5155, Route 11, Brantville, New Brunswick (CA), E9H 1M5; Adelbert Comeau, 26 Robertson Road, Brantville, New Brunswick (CA), E9H 1M5

( * ) Notice: Subject to any disclaimer, the term of this patent is extended or adjusted under 35 U.S.C. 154(b) by 0 days.

(21) Appl. No.: 09/851,558

(22) Filed: May 10, 2001

(65) Prior Publication Data

US 2002/0038809 A1 Apr. 4, 2002

(30) Foreign Application Priority Data

Oct. 2, 2000 (CA) .............................................. 2321940

(51) Int. Cl.⁷ ................................................. B60B 7/04
(52) U.S. Cl. ....................... 224/275; 15/236.02; 15/105; 24/579.11; 24/633; 224/163; 297/468
(58) Field of Search ................................ 224/275, 539, 224/163; D32/46, 49; 15/236.02, 105; 297/468; 24/602, 579.11, 633; 280/801.1

(56) References Cited

U.S. PATENT DOCUMENTS

| | | | | |
|---|---|---|---|---|
| 4,113,157 A | * | 9/1978 | Woodbury | 224/26 |
| 4,753,377 A | * | 6/1988 | Poluhowich | 224/163 |
| 4,832,410 A | * | 5/1989 | Bougher | 297/474 |
| 4,905,855 A | * | 3/1990 | Troiano et al. | 220/3 |
| 4,919,484 A | * | 4/1990 | Bougher et al. | 287/474 |
| 4,966,393 A | * | 10/1990 | Tokugawa | 280/801.1 |
| 5,121,527 A | * | 6/1992 | Righi | 24/602 |
| 5,123,673 A | | 6/1992 | Tame | 280/801 |
| 5,248,187 A | | 9/1993 | Harrison | 297/482 |
| D352,591 S | | 11/1994 | Laney | D2/631 |
| 5,381,590 A | | 1/1995 | Liou et al. | 24/602 |
| 5,542,590 A | * | 8/1996 | Pfitzenmaier | 224/275 |
| 5,596,312 A | * | 1/1997 | Fowler et al. | 280/801.1 |
| 5,687,890 A | * | 11/1997 | Wanner | 224/163 |
| 5,724,920 A | * | 3/1998 | Meisman et al. | 297/468 |
| D393,337 S | * | 4/1998 | Seki | D2/624 |
| 5,782,025 A | * | 7/1998 | Yoder | 42/1.09 |
| 5,788,282 A | | 8/1998 | Lewis | 280/808 |
| 5,795,030 A | | 8/1998 | Becker | 297/488 |
| 5,871,129 A | * | 2/1999 | Boncompagni | 224/163 |
| D424,767 S | * | 5/2000 | Shea | D32/48 |
| 6,318,610 B1 | * | 11/2001 | Doherty | 224/271 |
| 6,343,841 B1 | * | 2/2002 | Gregg et al. | 297/468 |
| D456,576 S | * | 4/2002 | Philipson | D32/49 |

FOREIGN PATENT DOCUMENTS

| | | |
|---|---|---|
| CA | 1032912 | 6/1978 |
| CA | 1116143 | 1/1982 |
| CA | 1281691 | 3/1991 |
| DE | 4019402 | 12/1991 |

* cited by examiner

Primary Examiner—Stephen P. Garbe
(74) Attorney, Agent, or Firm—Mario Theriault

(57) ABSTRACT

The backup buckle has a housing with juxtaposed first and second portions. A buckle mechanism is mounted in the first portion. A stiff plate is affixed to the buckle mechanism and extends along the second portion and away from the buckle mechanism. A latch blade is affixed to the stiff plate at a distance from the buckle mechanism. The backup buckle is mountable to a vehicle seat belt and is useful for offering an alternate release point along the seat belt in vehicles having hard-to-reach seat belt buckles. An objective of the backup buckle is to reduce the number of deaths and injuries caused by faulty seat belts retaining passengers in a vehicle on fire, in a submerged vehicle or in a vehicle in such condition as to create other life threatening situation. In another aspect of the invention, the housing of the backup buckle has a storage compartment therein for stowing personal articles.

20 Claims, 3 Drawing Sheets

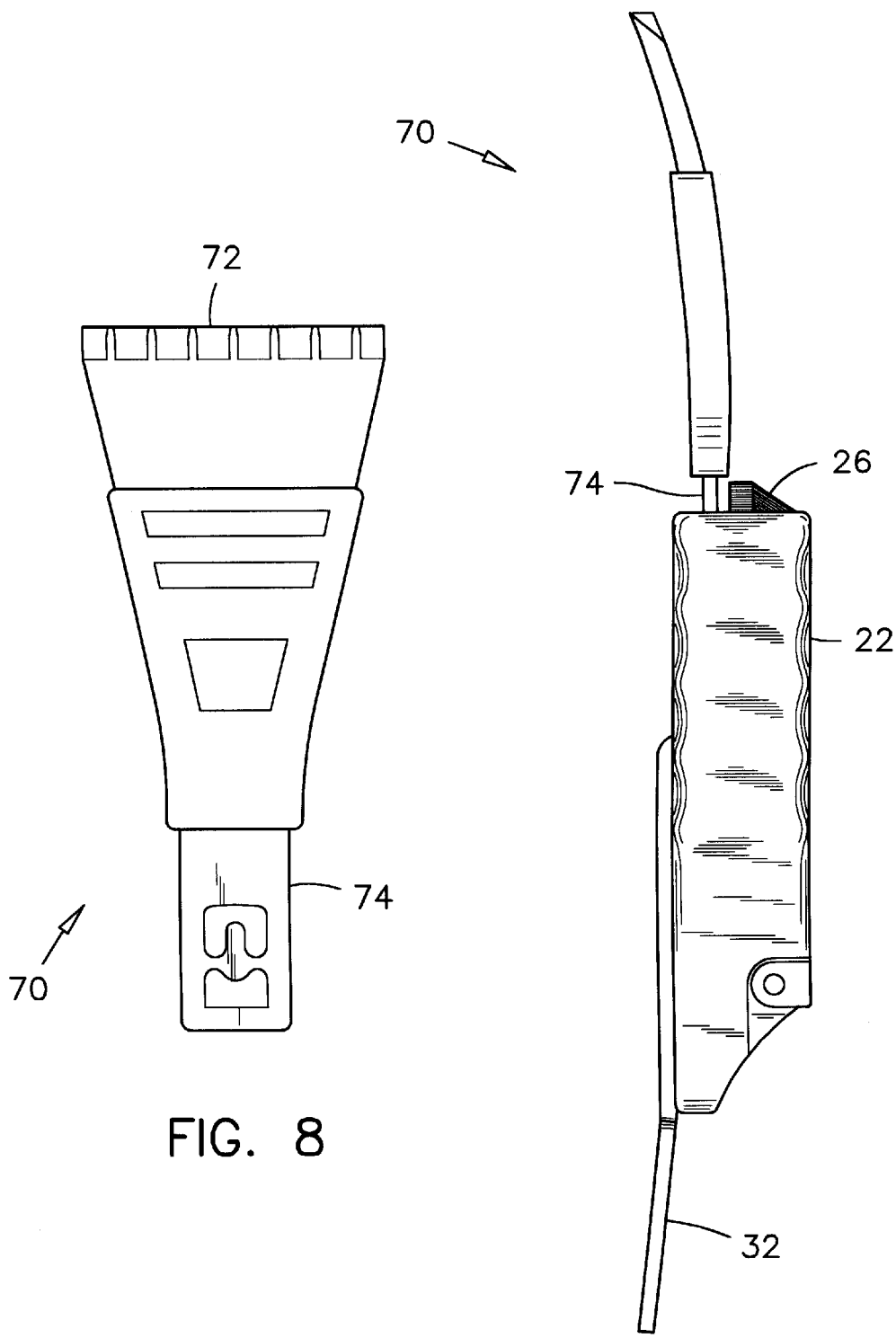

BACKUP BUCKLE FOR A SEAT BELT

FIELD OF THE INVENTION

This invention pertains to a backup buckle for installation on a vehicle seat belt in series with the seat belt buckle, to offer an alternate separation point along the seat belt.

BACKGROUND OF THE INVENTION

Although the jamming of a seat belt buckle is a now a rare occurrence, it is still heard of as the cause of deplorable tragedies. A seat belt buckle can become unworkable because of wear in the latch mechanism for example, or simply because it cannot be reached by the person wearing it. A seat belt buckle is generally mounted very close to the seat surface where it is hardly accessible to a heavy-featured person using the seat belt, or to anyone of many passengers sitting side-by-side on the same seat. For these reasons, basically, a need exists for a device which could provide additional safety in the release of a vehicle seat belt.

A number of devices have been developed in the past and offer various solutions to the problems encountered with seat belts. Some of these devices and solutions are described herein below.

A first solution to seat belt problems consists in automatically releasing the a seat belt buckle in emergency situations. Examples of these innovations are described in the following patents: CA 1,116,143 issued on Jan. 12, 1982 to G. J. Coulombe, and CA 1,032,912 issued on Jun. 13, 1978 to J. R. Hollins. In the first invention, a solenoid is used to release the buckle. The solenoid is activated by a timer and a circuit which is responsive to various accident condition sensors. In the second invention, the buckle release mechanism is connected by a vacuum hose to the engine's intake manifold. The buckle is automatically released when the engine has stalled, as due to an accident.

In another aspect of seat belt problems, the U.S. Pat. No. 5,381,590 issued on Jan. 17, 1995 to H. Y. Liou et al., describes a shock absorbing apparatus which in mounted between the buckle and the latch tongue of a seat belt. Upon impact, the device extends with a certain resistance to absorb the kinetic energy of the person wearing the seat belt.

The use of a pair of buckles, one on each side of the seat, has been proposed by other inventors. Examples of these systems are described in the following patent documents; CA 1,281,691 issued on Mar. 19, 1991 to J. C. Barton et al., and U.S. Pat. No. 5,123,673 issued on Jun. 23, 1992 to O. D. Tame.

As it was briefly mentioned hereinbefore, the use of seat belt represents some difficulties for many. The buckle of a seat belt is normally anchored to the floor or to the frame of a vehicle and usually stands beside the seat of the vehicle or lies very close to the surface of the seat. The buckle is difficult to reach for a strongly-featured individual, for a person wearing winter clothing, or for anyone of several persons crowded side-by-side on a same car seat. It is also difficult to attach a seat belt around an infant car seat, or to release the same seat belt. A number of seat belt extensions have been proposed in the past as part of a solution to these problems. Some of these seat belt extensions are described in the following patents:

U.S. Pat. No. 5,248,187 issued on Sep. 28, 1993 to R. G. Harrison;

U.S. Pat. No. Des. 352,591 issued on Nov. 22, 1994 to E. Laney;

U.S. Pat. No. 5,788,282 issued on Aug. 4, 1998 to D. J. Lewis, and

U.S. Pat. No. 5,795,030 issued on Aug. 18, 1998 to K. W. Becker.

Another inventor has developed an auxiliary buckle-and-tongue combination to offer an alternate release point along the seat belt. When this device is mounted on an vehicle seat belt, it provides with the vehicle seat belt buckle, three release mechanisms for use in emergency situations for unlatching the seat belt. This invention is described in the patent document DE 4,019,402 issued on Dec. 19, 1991 to R. Sirotzki.

Although several solutions to problems with seat belt buckles are available in the prior art, it is believed that these systems and devices are deficient in at least several importance features. For example, the last mentioned buckle-and-tongue combination consists of a two part set comprising a double buckle and a separate double-ended tongue which is adapted to mate into the double buckle and into the seat belt buckle of a vehicle. The double-ended tongue is thin and relatively small such that it can easily become lost in the cracks around and under the seats of a vehicle.

Similarly, each of the seat belt extensions mentioned above consists of a buckle and a latch tongue separated by a length of flexible belting. When the seat belt extension is not worn by a passenger, the flexible belting folds down to the floor or to the surface of the seat of the vehicle, sometime making the auxiliary buckle harder to reach than the existing seat belt buckle.

As such, it may be appreciated that there continues to be a need for a new and improved backup buckle which can be mounted into a common seat belt buckle, and which has a relatively voluminous and rigid body extending from the vehicle seat belt buckle, such that it is easily accessible to persons of all constitutions and to people in various sitting conditions inside a vehicle.

SUMMARY OF THE INVENTION

The backup buckle according to the present invention is mountable in series with a vehicle seat belt buckle for providing a second release point to untie a seat belt in the event that the vehicle seat belt buckle remains locked, jammed or stuck, following an accident for example.

In accordance with one feature of the present invention, there is provided a backup buckle comprising a housing having juxtaposed first and second portions, a buckle mechanism mounted in the first portion, a stiffplate affixed to the buckle mechanism and extending along the second portion and away from the buckle mechanism, and a latch blade affixed to the stiff plate at a distance from the buckle mechanism.

The backup buckle is mountable to a vehicle seat belt and is useful to provide an alternate release point along the seat belt in a vehicle having hard-to-reach seat belt buckles. More importantly, the major objective of this backup buckle is to reduce the number of deaths and injuries caused by faulty seat belts retaining passengers in a vehicle on fire, in a submerged vehicle or in a vehicle in such condition as to create other life threatening situation.

In accordance with another feature of the present invention, the housing of the backup buckle comprises a storage compartment for storing first aid items or personal articles.

In yet another feature of the present invention, the backup buckle is usable in combination with an automotive accessory. The automotive accessory comprises a latch tongue which is mountable in the buckle mechanism of the backup buckle, such that the backup buckle constitutes a handle for the automotive accessory. The backup buckle according to the present invention is therefor an invaluable multi-purpose automotive article.

Still another feature of the backup buckle of the present invention is that it is susceptible of a low cost of manufacture with regard to both materials and labour, and which accordingly is then susceptible of low prices of sale to the consumer, thereby making such backup buckle economically available to the public.

Other advantages and novel features of the present invention will become apparent from the following detailed description of the preferred embodiment.

BRIEF DESCRIPTION OF THE DRAWINGS

One embodiment of the present invention is illustrated in the accompanying drawings, in which like numerals denote like parts throughout the several views, and in which:

FIG. 8 is a top view of a window scraper mountable in the backup buckle according to the preferred embodiment;

FIG. 9 is a side view of the window scraper mounted in the buckle mechanism of the backup buckle according to the preferred embodiment.

DESCRIPTION OF THE PREFERRED EMBODIMENT

Figure 1:
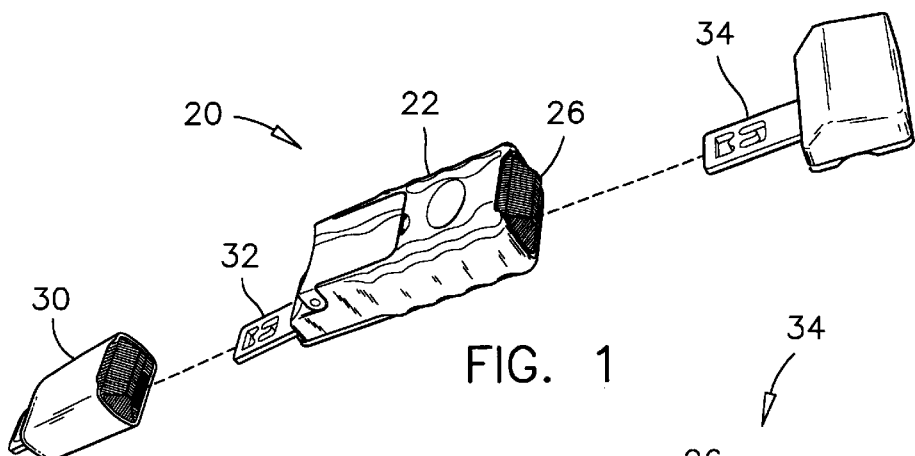
FIG. 1 is an exploded perspective view of a seat belt buckle assembly comprising a common seat belt buckle, a backup buckle according to the preferred embodiment of the present invention, and a common seat belt latch tongue.

While this invention is susceptible of embodiment in many different forms, there is shown in the drawings and will be described in details herein one specific embodiment, with the understanding that the present disclosure is to be considered as an example of the principles of the invention and is not intended to limit the invention to the embodiment illustrated and described. For example, the backup buckle is illustrated herein with a release button as used in late Ford™ vehicles. It will be appreciated that the release mechanism and the specific pattern of the latch blade are not part of the present invention, and other types of release buttons and latch blade patterns can also be used without limiting the scope of the present invention. The backup buckle according to the present invention can be manufactured in various configurations to mount in various makes and types of vehicles.

Referring to the FIGS. 1 to 7, the backup buckle according to the preferred embodiment of the present invention will be described in details. The backup buckle 20 according to the preferred embodiment comprises a housing 22 enclosing a buckle mechanism 24 of which the release button is indicated as label 26. The elements of the buckle mechanism 24 are substantially identical to the components in the vehicle seat belt buckle 30 on the seat belt to which the backup buckle 20 is mountable. The internal elements of the buckle mechanism 24 are not illustrated because this type of mechanism is known technology and does not constitute the focus of the present invention.

Figure 2:
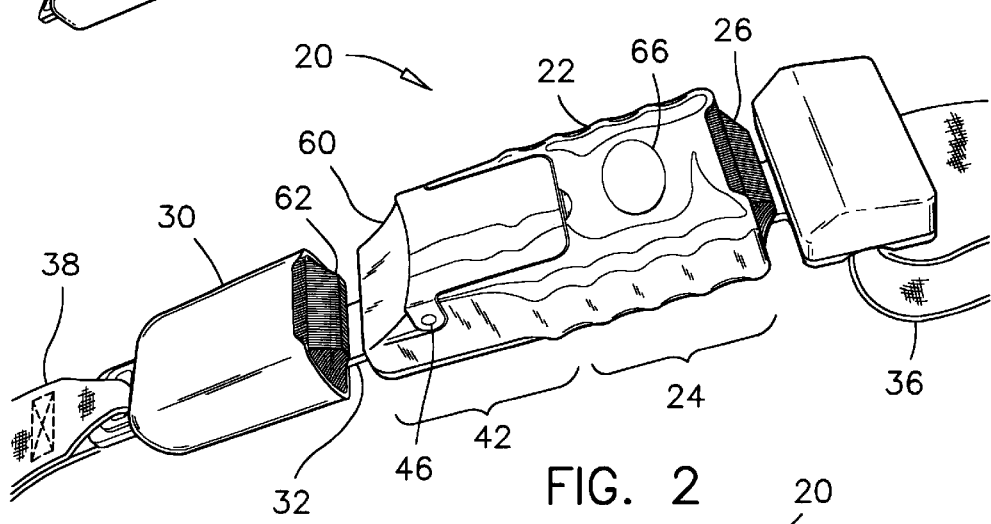
FIG. 2 is a perspective view of a seat belt buckle assembly comprising the backup buckle according to the preferred embodiment mounted into a common seat belt buckle and a common seat belt latch tongue engaged into the backup buckle.
Figure 3:
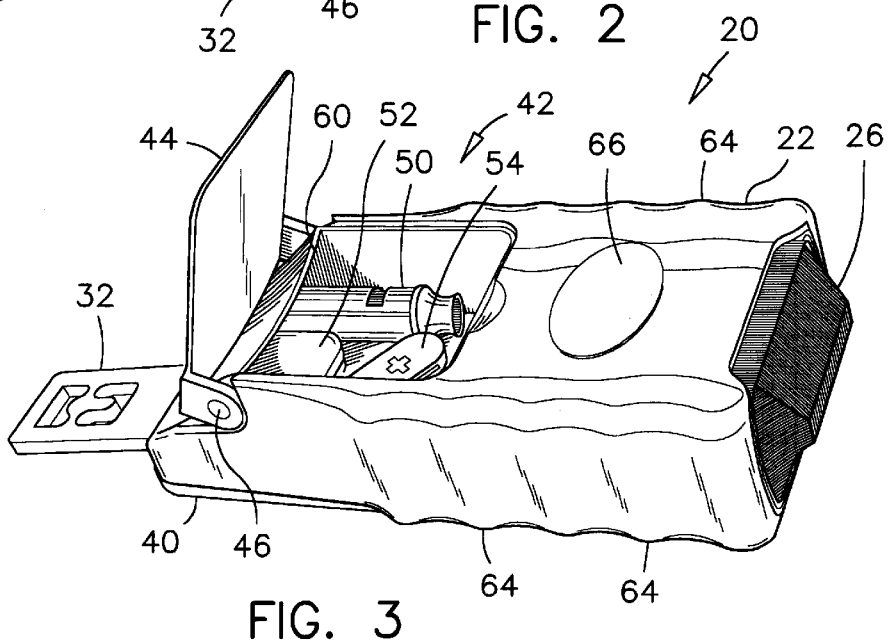
FIG. 3 is a perspective view of the backup buckle according to the preferred embodiment with the lid of the storage compartment thereof in an opened mode.

The latch blade 32 on the backup buckle 20 is substantially identical to the vehicle latch tongue 34 on the seat belt 36 to which the backup buckle 20 is mountable. The latch blade 32 is also known technology and does not in itself form the focus of the present invention. The combination of a buckle mechanism 24 with a latch blade 32 in a same buckle unit 20 constitutes a main feature of the present invention whereby the backup buckle 20 is mountable on a seat belt 36, between the vehicle seat belt buckle 30 and the latch tongue 34 of the seat belt 36 as illustrated in FIG. 2.

Figure 4:
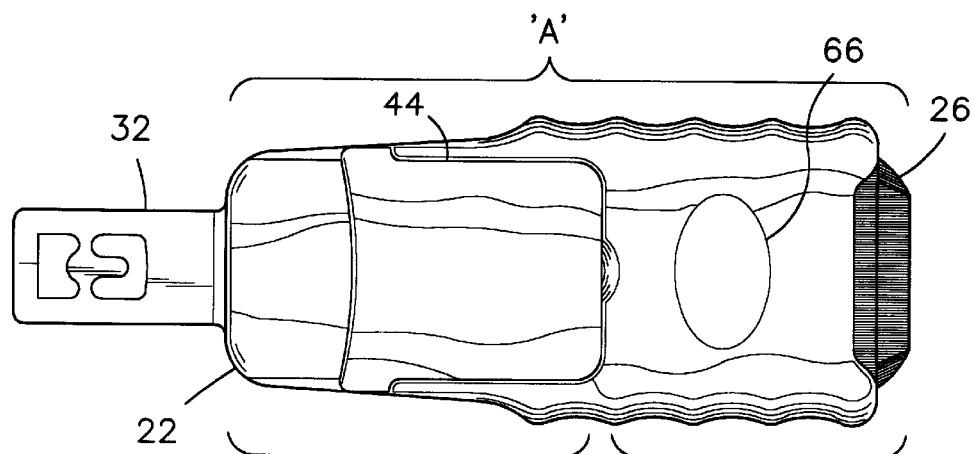
FIG. 4 is a top view of the backup buckle according to the preferred embodiment.

The backup buckle 20 provides an alternate release point along the seat belt 36. More importantly, the backup buckle 20 provides an alternate release button 26, which stands at a substantial distance from the seat belt's anchor point 38. In that respect, the length of the housing 22, as shown by label 'A' in FIG. 4, is preferably about 4–5 inches (10–12 cm). This distance has been found to be quite advantageous for placing the release button 26 of the backup buckle 20 at a position above the thighs of a person sitting on the car seat where the backup buckle is used, whether the vehicle seat belt buckle 30 stands along the seat or lies on the seat surface. Although the overall length 'A' of the housing as been shown as being about 4–5 inches (10–12 cm), it will be appreciated that other dimensions and shape may offer additional advantages in certain applications, such as a longer and curved model for use in school buses for example, or to extend around an infant car seat.

The latch blade 32 of the backup buckle 20 is retained to the buckle mechanism 24 by a stiff metal plate 40. The purpose of the metal plate 40 is to maintain the backup buckle 20 in alignment with the seat belt buckle 30 to which it is mounted. Therefore, at least in cases where the vehicle seat belt buckle 30 is anchored semi-rigidly to a vehicle body, the backup buckle stands in an upright mode, with the release button at a substantial distance 'A' from the vehicle seat belt buckle 30. In other cases where the vehicle seat belt buckle is flexibly anchored to a vehicle's floor, as shown at label 38 in FIG. 2, and lies on the seat of a vehicle, the backup buckle 20 rests at a distance from the backrest of the seat, where it is more accessible than the existing seat belt buckle 30.

Figure 5:
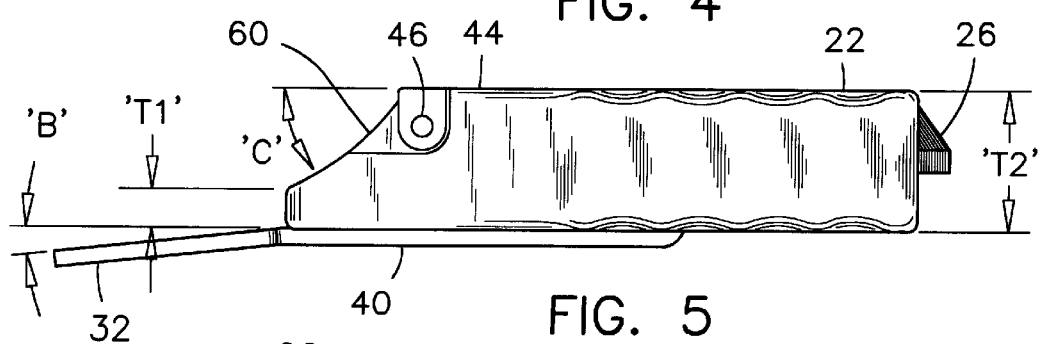
FIG. 5 is a side view of the backup buckle.
Figure 6:
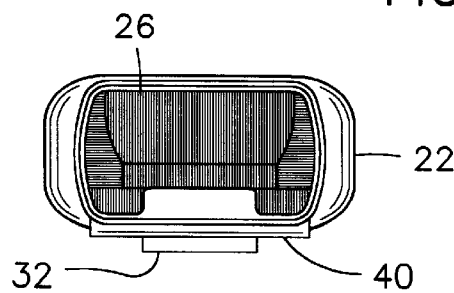
FIG. 6 is an end view of the backup buckle.
Figure 7:
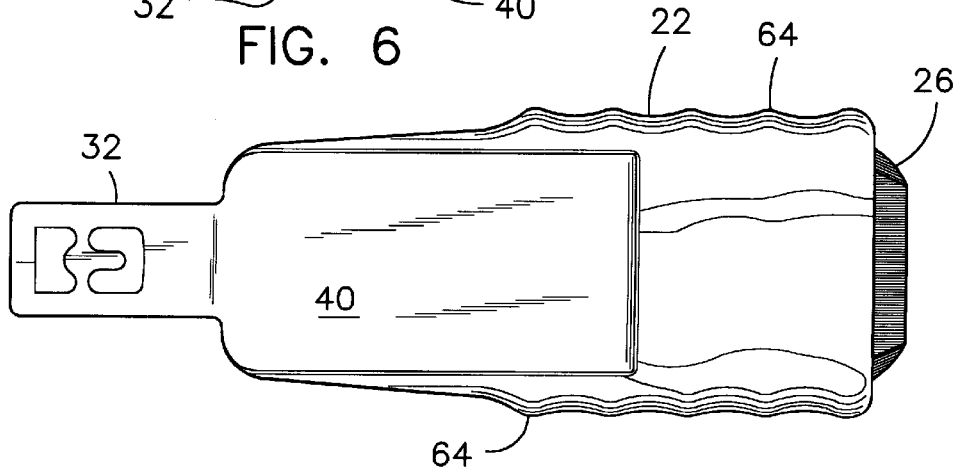
FIG. 7 is a bottom view of the backup buckle.

Referring now specifically to FIG. 5, the latch blade 32 of the backup buckle 20 makes an angle 'B' of about 4–6 degrees with the stiff plate 40. This angle is provided for the comfort of the person using the backup buckle 20.

Another feature of the backup buckle 20 according to the preferred embodiment consists in a storage compartment 42 mounted inside the housing 22 between the buckle mechanism 24 and the latch blade 32 and extending over the entire length of the stiff plate 40. The storage compartment 42 is covered by a lid 44 mounted on hinges 46 to the sides of the housing 22. The storage compartment 42 can be used to carry items as normally found in a first aid kit such as a whistle 50, a medicine tablet container 52 and a multipurpose knife 54. The storage compartment can also be used to stow away other items such as coins for a parking metre, a house key and jewelry.

The wall of the storage compartment 42 closest to the latch blade 32 is a sloping wall 60 having a sloping angle 'C' of about 40 degrees. The thickness 'T1' of the housing 22 near the latch blade 32 is therefore less than one half the thickness 'T2' of the other end of the housing 22, as illustrated in FIG. 5. This sloping wall is advantageous for providing generous finger space in the front of the release button 62 of the vehicle seat belt buckle 30 as illustrated in FIG. 2.

Both sides of the housing 22 have notches 64 there along arranged to form finger grips for convenience when holding the backup buckle 20 in the hand. The finger grips 64 also constitute a tactile reference allowing a user to feel the backup buckle 20 over or along a car seat without looking for it.

A decal 66 is preferably affixed to the top surface of the housing 22 for the purpose of indicating the name of the user, the medical condition of the user or any other information related to the model and manufacturer of the backup buckle 20.

The entire backup buckle 20 as configured, has a substantial volume and weight. This weight and the firm grip provided by the notches 64 are advantageous for allowing the use of the backup buckle 20 as a striking tool for breaking a car window from the interior in an emergency situation. Similarly, the length 'A' of the housing 22 and of the latch blade 32, are advantageous for allowing the use of the backup buckle 20 as a prying tool for opening a damaged car door from the inside of the vehicle, in an emergency situation.

Referring now to FIGS. 8 and 9, there is illustrated a window scraper 70 for use with the backup buckle for scraping ice and snow from the windows of a vehicle. The preferred window scrapper has a scrapping tip 72 and a latch blade 74 which is mountable in the buckle mechanism 24 of the backup buckle 20.

It will be appreciated that the backup buckle 20 can be used as a handle for various other automotive tools and accessories, such as a small broom or a boot brush.

As to other manner of usage and operation of the present invention, the same should be apparent from the the above description and accompanying drawings, and accordingly further discussion relative to the manner of usage and operation of the invention would be considered repetitious and is not provided.

While one embodiment of the present invention has been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

We claim:

1. A backup buckle for mounting in series with a vehicle seat belt buckle, comprising;
   a first seat belt latch blade;
   a seat belt buckle mechanism rigidly affixed to said first seat belt latch blade and having means including a readily operable release button to releasably retain a second seat belt latch blade therein; and
   a housing made of first and second portions of similar volumes; said seat belt buckle mechanism being mounted inside said first portion; said second portion being mounted between said first portion and said first seat belt latch blade, and said first seat belt latch blade comprising a stiffplate extending along said second portion.

2. The backup buckle as claimed in claim 1, wherein said second portion comprises a storage compartment.

3. The backup buckle as claimed in claim 1, wherein said housing comprises finger notches therealong.

4. The backup buckle as claimed in claim 1, wherein said second portion comprises a sloping wall nearest said latch blade.

5. The backup buckle as claimed in claim 4, wherein said sloping wall has a sloping angle of about 40 degrees relative to a top surface of said housing.

6. The backup buckle as claimed in claim 1, wherein said first seat belt latch blade is bent about 5 degrees.

7. The backup buckle as claimed in claim 2, wherein said housing comprises a hinged lid over said storage compartment.

8. The backup buckle as claimed in claim 1, wherein said housing comprises a decal affixed thereto.

9. In combination, a vehicle seat belt comprising a vehicle seat belt buckle and a latch tongue, and a backup buckle affixed to said vehicle seat belt between said vehicle seat belt buckle and said latch tongue, said backup buckle comprising;
   a seat belt buckle mechanism having means to releasably retain a latch tongue therein and;
   a latch blade rigidly affixed to said seat belt buckle mechanism and extending away from said means to releasably retain a latch tongue, and
   a housing made of a first and second portions of similar volumes; said seat belt buckle mechanism being mounted inside said first portion; said second portion being mounted between said first portion and said latch blade, and said latch blade comprising a stiff plate extending along said second portion;
   said latch blade being engaged in said vehicle seat belt buckle and said latch tongue being engaged in said seat belt buckle mechanism.

10. The combination as claimed in claim 9, wherein said second portion comprises a storage compartment.

11. The combination as claimed in claim 9, wherein said housing comprises finger notches therealong.

12. The combination as claimed in claim 9, wherein said second portion comprises a sloping wall nearest said latch blade.

13. The combination as claimed in claim 12, wherein said sloping wall has a sloping angle of about 40 degrees relative to a top surface of said housing.

14. The combination as claimed in claim 9, wherein said latch blade is bent about 5 degrees.

15. The combination as claimed in claim 10, wherein said housing comprises a hinged lid over said storage compartment.

16. The combination as claimed in claim 9, wherein said housing comprises a decal affixed thereto.

17. In combination, a backup buckle for mounting in series with a vehicle seat belt buckle, comprising a housing and a buckle mechanism mounted in said housing, and
   an automotive accessory having a seat belt latch tongue affixed thereto and engaged into said buckle mechanism,
   such that said backup buckle is usable as a handle for said automotive accessory when said backup buckle is not mounted to a seat belt.

18. The combination as claimed in claim 17, wherein said housing has finger notches therealong.

19. The combination as claimed in claim 17, wherein said automotive accessory is a window scraper.

20. The combination as claimed in claim 17, wherein said backup buckle further comprises a seat belt latch blade rigidly affixed to said buckle mechanism and wherein said housing is made of first and second portions of similar volumes; said buckle mechanism being mounted inside said first portion; said second portion being mounted between said first portion and said seat belt latch blade, and said seat belt latch blade comprising a stiff plate extending along said second portion.

* * * * *